(12) United States Patent
Blumenfeld et al.

(10) Patent No.: US 12,380,417 B2
(45) Date of Patent: Aug. 5, 2025

(54) METHOD AND SYSTEM OF PROVIDING METAVERSE DIGITAL ASSET BASED ON RETAILER DESIRED PURCHASE, PARTICIPATION OR ACTION

(71) Applicant: TARGET BRANDS, INC., Minneapolis, MN (US)

(72) Inventors: John Blumenfeld, Minneapolis, MN (US); Corey Hadden, Minneapolis, MN (US); Harrison Lynch, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 271 days.

(21) Appl. No.: 18/155,326

(22) Filed: Jan. 17, 2023

(65) Prior Publication Data

US 2024/0242255 A1 Jul. 18, 2024

(51) Int. Cl.
| | | |
|---|---|---|
| *G06Q 20/12* | (2012.01) | |
| *G06F 21/10* | (2013.01) | |
| *G06Q 20/06* | (2012.01) | |
| *G06Q 30/0207* | (2023.01) | |
| *G06Q 30/0601* | (2023.01) | |

(52) U.S. Cl.
CPC ....... *G06Q 20/1235* (2013.01); *G06F 21/108* (2023.08); *G06Q 20/065* (2013.01); *G06Q 30/0222* (2013.01); *G06Q 30/0239* (2013.01); *G06Q 30/0643* (2013.01); *G06Q 2220/10* (2013.01)

(58) Field of Classification Search
CPC ........... G06Q 30/0222; G06Q 30/0239; G06Q 2220/10; G06F 21/108
See application file for complete search history.

(56) References Cited

U.S. PATENT DOCUMENTS

| | | | | |
|---|---|---|---|---|
| 7,604,525 B2* | 10/2009 | Ganz | ................. | G06Q 30/0601 446/175 |
| 7,862,428 B2* | 1/2011 | Borge | .................... | A63H 13/02 463/32 |
| 8,205,158 B2* | 6/2012 | Ganz | ..................... | G06Q 30/02 715/741 |
| 8,818,845 B2 | 8/2014 | Mosites et al. | | |
| 8,863,295 B1* | 10/2014 | Le | ........................... | H04L 63/08 726/2 |

(Continued)

*Primary Examiner* — Steven S Kim
(74) *Attorney, Agent, or Firm* — HSML P.C.

(57) ABSTRACT

A method for providing a metaverse digital asset for use with a metaverse platform upon at least partial completion of a retailer desired purchase, participation or action. The method includes a retailer online service identifying that a guest has at least partially completed the retailer desired purchase, participation or action. An order tracking API of the retailer online service confirms that the retailer desired purchase, participation or action has been at least partially completed. A digital asset key API of the retailer online service obtains a digital asset key associated with the retailer desired purchase, participation or action. Upon confirmation that the retailer desired purchase, participation or action has been at least partially completed, the retailer online service provides the digital asset key to the guest. The digital asset key is configured to be used in the metaverse platform to redeem the metaverse digital asset.

12 Claims, 8 Drawing Sheets

(56) References Cited

U.S. PATENT DOCUMENTS

| | | | |
|---|---|---|---|
| 9,364,744 B2 | 6/2016 | Auterio et al. | |
| 9,576,428 B2 | 2/2017 | Argue et al. | |
| 9,649,566 B2 | 5/2017 | Mahajan et al. | |
| 9,895,612 B2 | 2/2018 | Pacey et al. | |
| 10,881,954 B2 | 1/2021 | Auterio et al. | |
| 11,238,476 B2 | 2/2022 | Koenig et al. | |
| 11,295,318 B2 * | 4/2022 | Andon et al. | |
| 2003/0167203 A1 * | 9/2003 | Thorne | G06Q 30/02 705/14.26 |
| 2012/0087367 A1 * | 4/2012 | Anikin | H04L 67/54 709/205 |
| 2012/0290447 A1 | 11/2012 | Hershenson | |
| 2018/0336592 A1 * | 11/2018 | Kurra | G06Q 30/0261 |
| 2020/0327772 A1 * | 10/2020 | Babb | G06F 9/547 |
| 2020/0342446 A1 * | 10/2020 | Mullen | G06Q 30/0207 |
| 2021/0125212 A1 * | 4/2021 | Ganz | G06F 16/953 |
| 2021/0406923 A1 | 12/2021 | Cherry et al. | |
| 2022/0294630 A1 * | 9/2022 | Collen | H04L 9/3213 |
| 2023/0196341 A1 * | 6/2023 | Quigley | G06Q 30/0631 705/65 |
| 2023/0237483 A1 * | 7/2023 | Gagne-Keats | G06Q 20/4014 705/66 |
| 2024/0095700 A1 * | 3/2024 | McDonnell | G06Q 30/0224 |

* cited by examiner

METHOD AND SYSTEM OF PROVIDING METAVERSE DIGITAL ASSET BASED ON RETAILER DESIRED PURCHASE, PARTICIPATION OR ACTION

FIELD

This disclosure relates generally to providing a metaverse digital asset based on a guest at least partially completing a retailer desired purchase, participation or action. More specifically, this disclosure relates to a method and system for providing an exclusive metaverse digital asset that can only be obtained and used by a guest in a metaverse platform based on the guest at least partially completing a retailer desired purchase, participation or action.

BACKGROUND

Online retail shopping continues to evolve as retailer online services look for new ways of increasing engagement with guests visiting the retailer online service. Guests are spending more time in virtual worlds (e.g., a metaverse). Creating engagement between the retailer online service and guests via a metaverse platform is desirable.

SUMMARY

This disclosure relates generally to providing a metaverse digital asset based on a guest at least partially completing a retailer desired purchase, participation or action. More specifically, this disclosure relates to a method and system for providing an exclusive metaverse digital asset that can only be obtained and used by a guest in a metaverse platform based on the guest at least partially completing a retailer desired purchase, participation or action.

The embodiments disclosed herein can allow a retailer to partner with one or more metaverse platforms to allow the retailer to provide a digital asset key that can be used to redeem an exclusive metaverse digital asset based on a guest completing a retailer desired purchase, participation or action.

In some embodiments, upon confirmation that the guest has at least partially completed the retailer desired purchase, participation or action, the retailer can provide a digital asset key that can be used in the metaverse platform to redeem an exclusive metaverse digital asset.

In some embodiments, the combination of the physical product (or retail service) and the exclusive metaverse digital asset can be a limited time offer.

In some embodiments, the exclusive metaverse digital asset can only be available to a guest who completes the retailer desired purchase, participation or action (e.g., purchases a physical product or retail service, attends a retailer event, performs a desired retailer action).

In some embodiments, the exclusive metaverse digital asset can be a virtual replica digital asset of a purchased physical product.

In some embodiments, the exclusive metaverse digital asset can be a combination of the virtual replica digital asset with an additional digital asset.

In some embodiments, the exclusive metaverse digital asset can be used in a metaverse platform as an accessory for an avatar of the guest or can be used by the guest as an item within the metaverse platform.

In some embodiments, the exclusive metaverse digital asset can be a non-fungible token.

In some embodiments, the digital asset key can be delivered via an electronic communication (e.g., email, text, etc.), provided and activated during an online or in store checkout of a purchased physical product or retail service, etc.

In some embodiments, the digital asset key can be revoked and/or cancelled upon return of the physical product or cancellation of the retail service. In particular, in some embodiments, the retailer can alert the metaverse platform of the returned physical product or cancelled retail service and request cancelation/revocation of the digital asset key.

In some embodiments, the retailer can store and deliver the digital asset key or can use a vendor service to track and send digital asset keys.

In some embodiments, a retailer graphical user interface (GUI) can allow a guest to link a retailer guest account with a specific metaverse guest account.

In some embodiments, the retailer GUI can allow a guest to select a specific metaverse platform from a plurality of metaverse platforms in which the exclusive metaverse digital asset can be redeemed and used.

In one embodiment, a method for providing a metaverse digital asset for use with a metaverse platform based on a guest at least partially completing a retailer desired purchase, participation or action is provided. The method includes a retailer online service identifying that a guest has at least partially completed the retailer desired purchase, participation or action. An order tracking application programming interface (API) of the retailer online service confirms that the retailer desired purchase, participation or action has been at least partially completed. A digital asset key API of the retailer online service obtains a digital asset key associated with the retailer desired purchase, participation or action. Upon confirmation that the retailer desired purchase, participation or action has been at least partially completed, the retailer online service provides the digital asset key to the guest. The digital asset key is configured to be used in the metaverse platform to redeem the metaverse digital asset.

In another embodiment, a system configured to provide a metaverse digital asset based on a guest at least partially completing a retailer desired purchase, participation or action is provided. The system includes a retailer online service that includes an order tracking API and a digital asset key API. The order tracking API is configured to confirm that the retailer desired purchase, participation or action has been at least partially completed. The digital asset key API is configured to obtain a digital asset key associated with the retailer desired purchase, participation or action. The retailer online service is configured to identify that a guest has at least partially completed the desired retailer purchase, participation or action. Also, upon confirmation that the retailer desired purchase, participation or action has been at least partially completed, the retailer online service is configured to provide the digital asset key to the guest. The digital asset key is configured to be used in the metaverse platform to redeem the metaverse digital asset.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to providing a metaverse digital asset based on a guest at least partially completing a retailer desired purchase, participation or action. More specifically, this disclosure relates to a method and system for providing an exclusive metaverse digital asset that can only be obtained and used by a guest in a metaverse platform based on the guest at least partially completing the retailer desired purchase, participation or action.

As defined herein, a retailer GUI can be, for example, a website, an app, etc. that allows guests to browse, shop for, and purchase products available for purchase from a retailer.

A metaverse platform, as defined herein, refers to a virtual-reality space in which users can interact with a computer-generated environment and other users.

A metaverse digital asset, as defined herein, refers to one or more digital objects that can be interacted with by a user in a metaverse platform. An exclusive metaverse digital asset, as defined herein, refers to one or more digital objects that are only available upon purchase and confirmation of delivery of a physical product (or confirmation of at least partial completion of a retail service) that is associated with the exclusive metaverse digital asset. In some embodiments, purchase of the combination of a physical product (or the retail service) and the associated exclusive metaverse digital asset can be a limited time offer. In some embodiments, the exclusive metaverse digital asset can include a replica digital asset of the purchased physical product. In some embodiments, the exclusive metaverse digital asset can include the replica digital asset and one or more additional accessory digital assets. In some embodiments, the metaverse digital asset can include a digital concert ticket to attend a concert performed in the metaverse platform. In some embodiments, the metaverse digital asset can include a digital movie ticket to watch a movie in the metaverse platform. In some embodiments, the exclusive metaverse digital asset can include a non-fungible token (NFT). In some embodiments, the replica digital asset can be used in the metaverse platform as an accessory for an avatar of the guest. In some embodiments, the replica digital asset can be used by the guest as an item within in the metaverse platform.

A desired retailer purchase, participation or action can include, for example, a guest purchasing a physical product or purchasing a retailer service, a guest participating in a retailer event (e.g., a retailer coordinated or sponsored concert, book reading, holiday party, etc.), a guest performing a retailer desired action (e.g., creating an account on the retailer online service; uploading user generated content onto the retailer GUI 120; promoting the retailer on a social media platform; etc.), etc. Accordingly, the desired retailer purchase, participation or action may not require a monetary purchase.

A digital asset key, as defined herein, is configured to allow a guest to access a metaverse digital asset that can be used in a metaverse platform. In some embodiments, the digital asset key can be a global unique identification number (GUID).

Examples of retail services can include, for example, selling optical glasses, subscription to a beauty box service, nail salon services, air time with a mobile carrier, assembly and installation, device repair, bike repair, order pickup (e.g., drive up order pickup, store order pickup, etc.), store events (e.g., back to college event(s), parking lot/park concert(s), trick or treat event(s), reading event(s), etc.), quick response (QR) code scanning in retailer catalogue, QR code scanning on a user device, etc.

Figure 1:
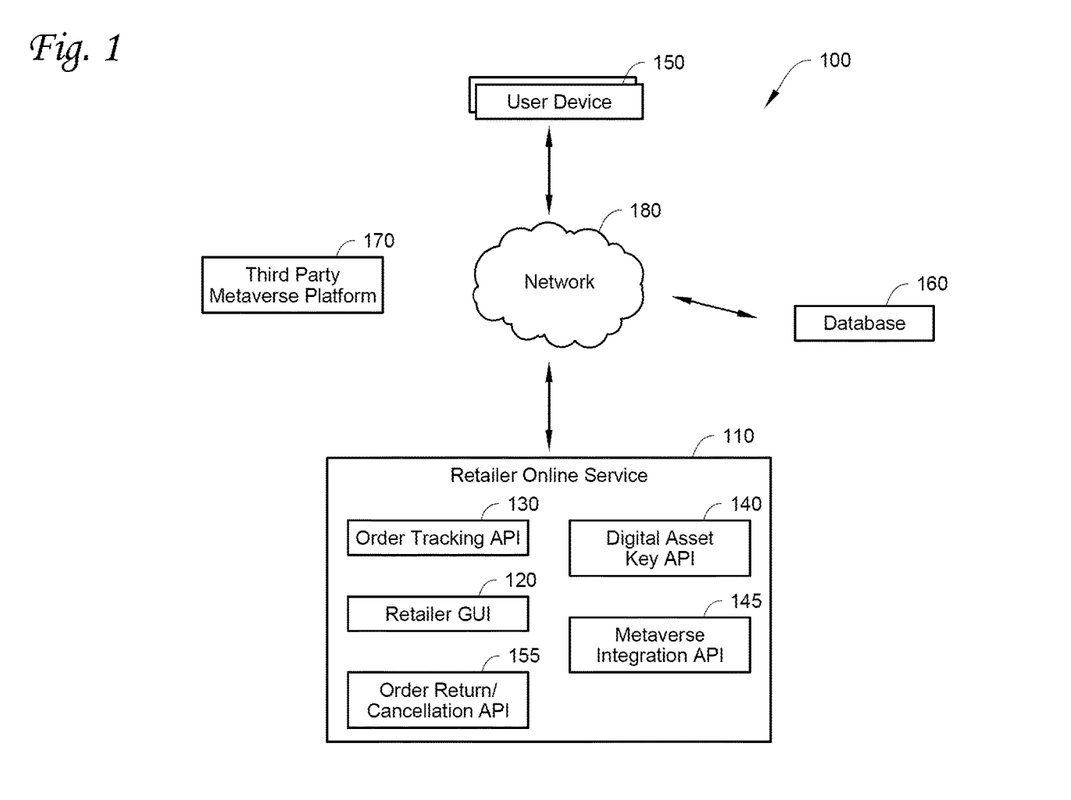
FIG. 1 illustrates a schematic diagram of a system for providing a metaverse digital asset based on a guest at least partially completing a retailer desired purchase, participation or action, according to one embodiment.

FIG. 1 is a schematic diagram of a system 100 for providing a metaverse digital asset based on a guest completing a retailer desired purchase, participation or action, according to one embodiment. The system 100 includes a retailer online service 110, one or more user devices 150, a database 160, one or more metaverse platforms 170, and a network 180 connecting the retailer online service 110, the one or more user devices 150, the database 160, and the one or more metaverse platforms 170.

The retailer online service 110 includes a retailer GUI 120, an order tracking application programming interface (API) 130, a digital asset key API 140, a metaverse integration API 145, and an order return/cancellation API 155. The retailer online service 110 is configured to provide an online shopping experience for guests accessing the retailer GUI 120 via the one or more user devices 150. In some embodiments, the retailer online service 110 is configured to manage (e.g., obtain, provide, and cancel/revoke) digital asset keys that can be used to retrieve exclusive metaverse digital assets for use with at least one of the one or more metaverse platforms 170. It will be appreciated that in other embodiments, the retailer online service 110 can include more or less APIs than those shown in FIG. 1 as required to perform the methods and systems described herein. In some embodiments, aspects of the retailer online service 110 can be the same as or similar to aspects of the server device 935 shown and described in accordance with FIG. 7 below.

The retailer GUI 120 is configured to allow user(s), via the one or more user devices 150, to browse, shop for, and purchase products and services from a retailer. The retailer GUI 120 can also be configured to provide opportunities for guest participation or action with retailer curated events or promotions. In some embodiments, the retailer GUI 120 can be configured to facilitate NFT commerce (including minting NFT(s); providing an exchange or transactional marketplace for ownership and distribution (including via blockchain); etc.). The retailer GUI 120 can be accessed by the user device(s) 150 via a website, an app, etc. Portions of the retailer GUI 120 can display messages advertising exclusive metaverse digital assets that can be redeemed in one or more of the metaverse platforms 170 upon a guest completing a retailer desired purchase, participation or action. FIGS. 3A-E and 4, described below, illustrate different screenshots of messages that may be displayed on the retailer GUI 120 or as advertisements on various websites or social media platforms.

The order tracking API 130 is configured to confirm whether a retailer desired purchase, participation or action has been at least partially completed. In some embodiments, this can include the order tracking API 130 being configured to track purchase orders made via the retailer online service 110. In particular, the order tracking API 130 can confirm whether a purchased physical product has been delivered to the guest or has been picked up by the guest, or the retail service has been at least partially completed. In some embodiments, the order tracking API 130 can communicate with a tracking system of a delivery vendor to determine that the purchased physical product has been delivered to the guest (or the retail service has been at least partially completed) and/or communicate with an inventory management system (not shown) at one or more retailer stores to determine that the purchased physical product has been picked up by the guest. In some embodiments, the order tracking API 130 can communicate with a backend service of the retailer online service 110 to determine that a guest has participated (or the retail service has been at least partially completed).

The digital asset key API 140 is configured to obtain and provide a digital asset key that is associated with an exclusive metaverse digital asset. In some embodiments, the digital asset key API 140 can communicate with the one or more metaverse platforms 170 to request and obtain the digital asset key. In some embodiments, the digital asset key API 140 can communicate with the database 160 to request and obtain the digital asset key. Once the digital asset key API 140 obtains the digital asset key, the digital asset key API 140 can also be configured to provide the digital asset key to the guest. In some embodiments, the digital asset key API 140 provides the digital asset key to the guest in an electronic communication (e.g., email, text, etc.).

The metaverse integration API 145 is configured to allow the retailer online service 110 to communicate and interact with one or more of the metaverse platforms 170. In some embodiments, the metaverse integration API 145 is configured to link a guest account of the retailer online service 110 with a metaverse account of one or more of the metaverse platforms 170. This can allow a digital asset key provided by the digital asset key API 140 of the retailer online service 110 to be automatically transferred to a user account associated with one of the metaverse platforms 170. In some embodiments, the metaverse integration API 145 can communicate with the one or more metaverse platforms 170 to revoke/cancel a digital asset key when, for example, the retailer online service 110 determines that a physical product associated with the digital asset key has been returned to the retailer (or a retail service associated with the digital asset key has been cancelled).

The order return/cancellation API 155 is configured to track whether a guest has returned the purchased physical product or has cancelled the purchased retail service. In some embodiments, the order return/cancellation API 155 can communicate with backend services of the retailer to determine that the purchased physical product has been returned or the purchased retail service has been cancelled.

The one or more user devices 150 are configured to access the retailer online service 110 and/or the one or more metaverse platforms 170 via the network 180. The one or more user devices 150 are the same as or similar to aspects of the computer device 900 as shown and described in accordance with FIG. 7 below. The user device(s) 150 can include, but are not limited to, a desktop computer, a cellular/mobile phone, a tablet device, a laptop computer, video game console, etc.

The database 160 is configured to store digital asset keys that can be used to unlock an exclusive metaverse digital asset for use with at least one of the one or more metaverse platforms 170. In some embodiments, the database 160 can store a list of digital asset keys provided by one or more of the metaverse platforms. The database 160 can be accessed by the retailer online service 110 (e.g., the digital asset key API 140) to obtain one or more digital asset keys. In some embodiments, the database 160 can be managed by a third party vendor service (not shown) or one or more of the metaverse platforms 170. In other embodiments, the database 160 can be managed by the retailer online service 110. In some embodiments, the database 160 can be configured to generate digital asset key(s) on demand and potentially in real time. In some embodiments, the retailer online service 110 (e.g., the digital asset key API 140) can communicate with the third party metaverse platform 170 (e.g., via the metaverse integration API 145) to request a digital asset key. The third party metaverse platform 170 can use the database 160 to send (and potentially generate) the requested digital asset key. While the database 160 is shown separate from the retailer online service 110, it will be appreciated that in other embodiments the database 160 can be part of the retailer online service 110.

It will also be appreciated that in some embodiments each digital asset key can only be recognized by and redeemed for one of the metaverse platforms 170. Thus, in these embodiments the database 160 can include one or more lists of digital asset keys for each of the metaverse platforms 170. In other embodiments a digital asset key can be recognized by and redeemed for two or more of the metaverse platforms 170. In these embodiments, the database 160 can include a single list of digital asset keys that can be used for two or more of the metaverse platforms 170.

The one or more metaverse platforms 170 are configured to provide a virtual-reality space in which users can interact with a computer-generated environment and other users. In some embodiments, the one or more metaverse platforms 170 are third party metaverse platforms that are separate and independent from the retailer. In other embodiments, one or more of the metaverse platforms 170 is a retailer multiverse platform.

In some embodiments, the network 180 can be representative of the Internet. In some embodiments, the network 180 can include one or more local area networks (LANs), one or more wide area networks (WANs), one or more wireless networks, one or more cellular data networks, suitable combinations thereof, or the like. In an embodiment, aspects of the network 180 can be the same as or similar to aspects of the network 940 as shown and described in accordance with FIG. 7 below.

Figure 2:
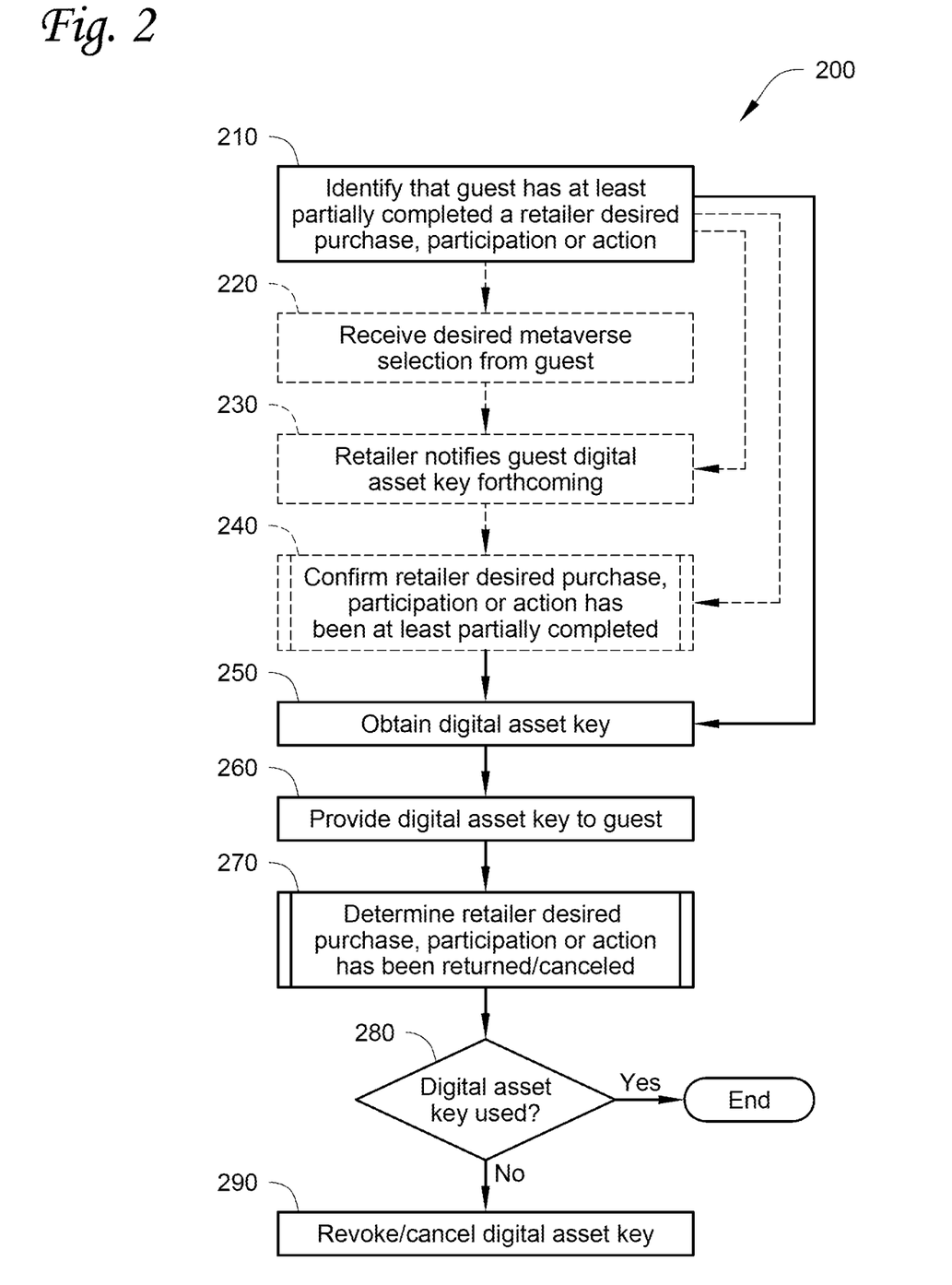
FIG. 2 illustrates a flowchart of a method for providing a metaverse digital asset based on a guest at least partially completing a retailer desired purchase, participation or action, according to one embodiment.

FIG. 2 illustrates a flowchart of a method 200 for providing a metaverse digital asset based on the purchase of a physical product or retail service. In some embodiments, the method 200 can be implemented using the system 100 shown in FIG. 1.

The method 200 begins at 210 whereby the retailer online service 110 identifies that a guest has completed a retailer desired purchase, participation or action. In some embodiments, the guest can complete a retailer desired purchase, participation or action from the retailer online service 110 using one or more of the user devices 150 connected to the retailer GUI 120 via the network 180. In some embodiments, when purchasing the physical product from the retailer online service 110, the guest can choose whether to have the physical product delivered to an address provided by the guest or to a particular retail store selected by the guest for pickup. In some embodiments, the guest can complete a retailer desired purchase, participation or action at a retail store. In these embodiments, the retailer online service 110 can identify that the guest has completed a retailer desired purchase, participation or action based on, for example, guest account information provided by the guest while at the retailer checkout register. The method 200 then proceeds to optional 220, to optional 230, to optional 240, or directly to 250. It will be appreciated that when the physical product or the retail service is purchased via the retailer online service 110, the method 200 will proceed to optional 230.

At optional 220, the guest can be provided an option to select a desired metaverse platform from the one or more metaverse platforms 170 on which the metaverse digital asset can be used. For example, in some embodiments, the guest can choose select one or more of Roblox™, Fortnite®, Minecraft™, etc. In some embodiments, the retailer online service 110 can allow the guest to select the metaverse platform on which the metaverse digital asset can be used. For example, upon a guest completing a retailer desired purchase, participation or action via the retailer GUI 120 at 210, the retailer GUI 120 can provide a list of one or more metaverse platforms and allow the guest to select the desired metaverse platform on the retailer GUI 120 via one or more of the user devices 150.

Also, in some embodiments, the guest can choose to link a guest account associated with the retailer online service 110 with a metaverse account on one or more of the metaverse platforms 170. In particular, the retailer GUI 120 can request permission from the guest to link the guest account with the metaverse account. Upon the retailer GUI 120 receiving permission, the metaverse integration API 145 can provide the guest an interface viewable on the retailer GUI 120 for the guest to enter login information for logging into the metaverse account. In some embodiments, the guest can choose to link the guest account with the metaverse account regardless of whether the guest is provided an option select the desired metaverse platform. The method 200 then proceeds to 230.

At optional 230, the retailer notifies the guest that a digital asset key for redeeming the exclusive metaverse digital asset is forthcoming. In some embodiments, the retailer online service 110 can send an electronic notification (e.g., an email to an email address associated with the guest, a text message to a mobile number associated with the guest, etc.). For example, in some embodiments, the email address or mobile number can be provided by the guest while completing a retailer desired purchase, participation or action from the retailer at 210. In some embodiments, the email address or mobile number can be associated with a guest account for the retailer online service 110. In some embodiments, the electronic communication sent by the retailer online service 110 can notify the guest that the metaverse detail asset will be sent to the guest once the physical product is delivered or picked up from a retailer store or when the retail service has been at least partially completed.

Figure 5:
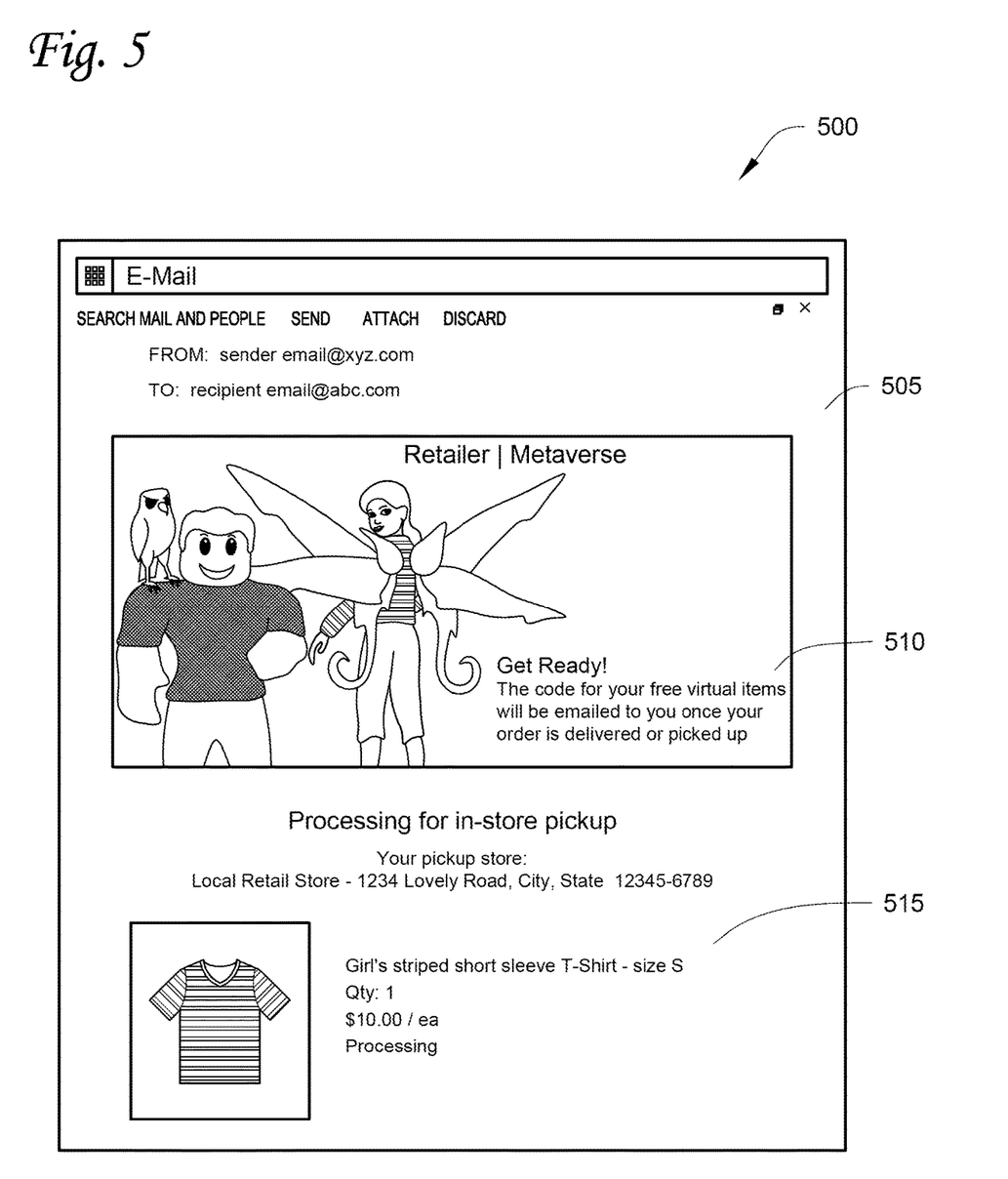
FIG. 5 illustrates a screenshot of an electronic communication that can be used to notify the guest that the digital asset key for redeeming the exclusive metaverse digital asset is forthcoming, according to one embodiment.

FIG. 5 illustrates a screenshot of an electronic communication 500 that can be used to notify the guest that the digital asset key for redeeming the exclusive metaverse digital asset is forthcoming. In this instance, the electronic communication 500 is an email provided when a physical product or retail service is purchased. The body 505 of the electronic communication 500 includes a message 510 indicating to the guest that the digital asset key will be electronically sent to the guest once the physical product is delivered or picked up at a retail store or the retail service has been at least partially completed. The body 505 also includes information 515 indicating the physical product or the retail service purchased, the order for the physical product or the retail service is being processed, and details regarding how the physical product is being delivered or how the retail service will be completed. In the non-limiting example shown in FIG. 5, the information 515 includes: the particular physical product purchased by the guest (in this case a particular graphic t-shirt) or the retail service purchased by the guest; the cost of the physical product or the retail service; the quantity of the physical product or the retail service purchased; the delivery method (in this case in-store pickup); and location where the physical product can be retrieved by the guest or where the retail service will be performed. It will be appreciated that a similar email communication can be used when a guest registers to participate for a retailer event or registers to perform a retailer desired action.

Returning to optional 230 in FIG. 2, upon notifying the guest that the digital asset key is forthcoming, the method 200 then proceeds to optional 240 if the guest has purchased a physical product or a retail service. Otherwise, the method 200 proceeds to 250.

At 240, when the guest has purchased a physical product or a retailer service, the retailer confirms that the purchased physical product has been delivered to the guest or the retail service has been at least partially completed. In some embodiments, the order tracking API 130 can determine that the purchased physical product has been delivered to the address provided by the guest or picked up at a retail store selected by the guest in order to confirm that the purchased physical product has been delivered to the guest. In some embodiments, the order tracking API 130 can determine that the purchased physical product has been delivered to the guest upon checkout at a register at the retail store. In some embodiments, the order tracking API 130 can be configured to wait a predefined amount of time after physical product is purchased or the retail service is requested before proceeding to 250. Upon confirmation that the purchased physical product has been delivered to the guest or that the retail service has been at least partially completed, the method 200 then proceeds to 250. In some embodiments, the order tracking API 130 can be configured to wait a predefined amount of time after physical product is purchased or the retail service is requested before proceeding to 250.

At 250, a digital asset key is obtained for redeeming the exclusive metaverse digital asset that is associated with the guest completing the retailer desired purchase, participation or action. In some embodiments, the digital asset key API 140 communicates with the one or more metaverse platform(s) 170 to request and obtain the digital asset key. In some embodiments, the digital asset key API 140 communicates with the database 160 to request and obtain the digital asset key. In some embodiments, the digital asset key API 140 communicates with the database 160 to request and obtain the digital asset key. Also, when the guest selects the desired metaverse platform at optional 220, the digital asset key API 140 is configured to obtain a digital asset key for the exclusive metaverse digital asset that is redeemable through the desired metaverse platform. In some embodiments, the retailer online service 110 can be configured to coordinate with a third party vendor to communicate with the metaverse platform(s) 170 and/or the database 160 to request and obtain the digital asset key. Once the digital asset key is obtained, the method 200 proceeds to 260.

At 260, the guest is provided the digital asset key for redeeming the exclusive metaverse digital asset that is associated with the guest completing the retailer desired purchase, participation or action. That is, once the guest receives the digital asset key, the guest can redeem the exclusive multiverse digital asset on one or more of the metaverse platforms 170.

In some embodiments, the retailer online service 110 can electronically send the digital asset key to an email address or mobile number associated with the guest. For example, in some embodiments, the email address or mobile number can be provided by the guest while purchasing the physical product or the retail service from the retailer at 210 or when registering to a desired retailer event associated with the retailer 210 or when performing an action desired by the retailer 210. In some embodiments, the email address or mobile number can be associated with a guest account for the retailer online service 110. In some embodiments, the retailer online service 110 can provide the digital asset key to a guest account for the retailer online service 110 provided by the guest via the retailer GUI 120. For example, the guest account can be the guest account used by the guest for purchasing the physical product or the retail service on the retailer online service 110 or for registering for the desired retailer event associated with the retailer 210 or for performing the action desired by the retailer 210.

In some embodiments, the retailer online service 110 can be configured to coordinate with a third party vendor to electronically send the digital asset key to the guest (e.g., via an email, text, etc.).

In some embodiments, the retailer online service 110 can include guest services that can retrieve a digital asset key for the guest when, for example, the guest cannot access their guest account, the email address provided by the guest is incorrect or is no longer accessible by the guest, etc.

Figure 6:
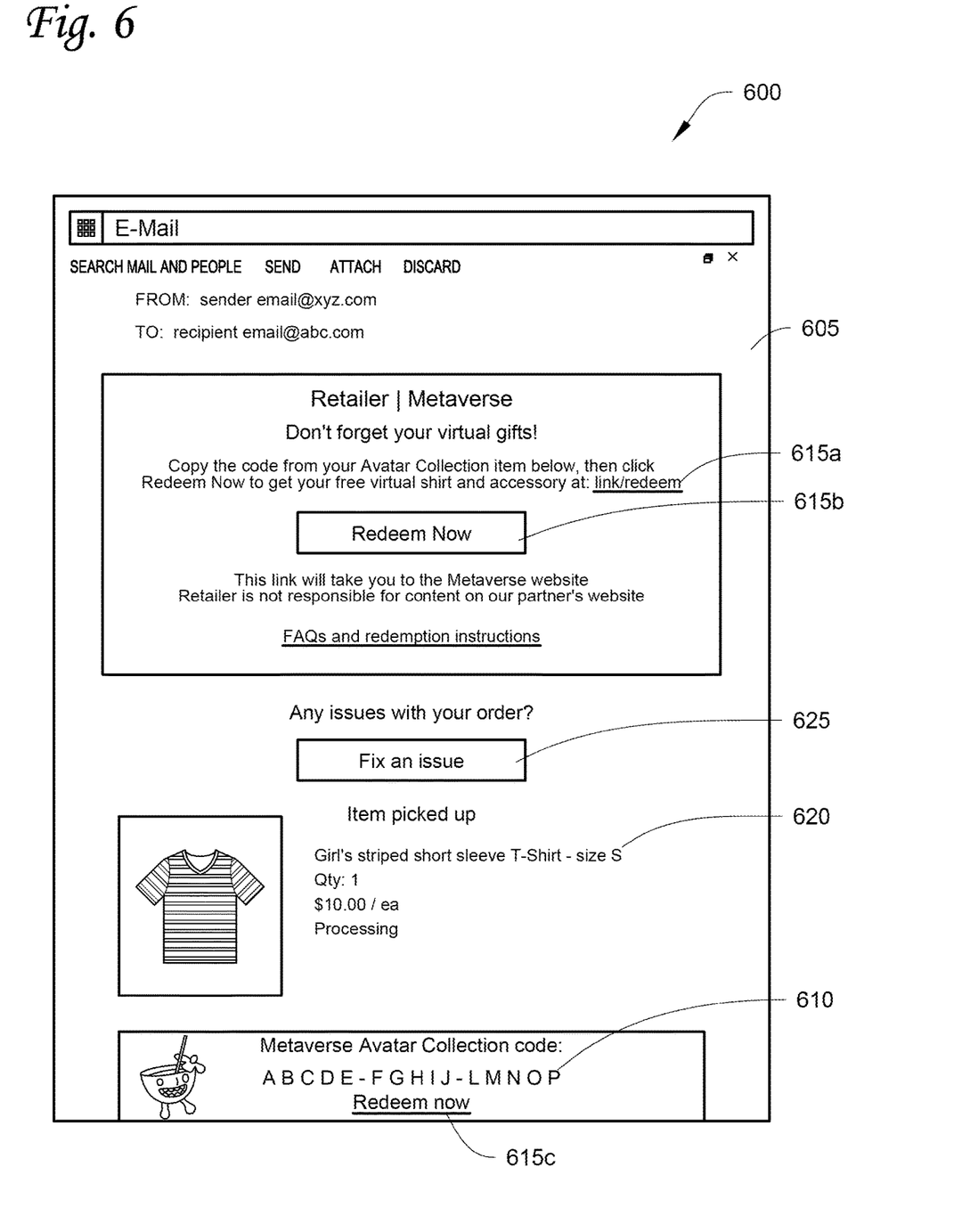
FIG. 6 illustrates a screenshot of an electronic communication that can be used to provide the guest the digital asset key for redeeming the exclusive metaverse digital asset, according to one embodiment.

FIG. 6 illustrates a screenshot of an electronic communication 600 that can be used to provide the guest the digital asset key for redeeming the exclusive metaverse digital asset. In this instance, the electronic communication 600 is an email provided when a physical product or retail service is purchased. The body 605 of the electronic communication 600 includes the digital asset key 610 that can be used on one or more third-party metaverse platforms 170 to redeem the exclusive metaverse digital asset. The body 605 also includes a plurality of links 615 that can transfer the guest to the appropriate metaverse platform(s) 170 to allow the guest to redeem their exclusive metaverse digital asset. The body 605 also includes information 620 indicating that the physical product has been received by the guest or the retail service has been at least partially completed and providing details of the physical product or retail service purchased.

The body 605 further includes a link 625 that can transfer the guest to the retailer GUI 120 to fix any issues with the order of the physical product or the retail service. In the non-limiting example shown in FIG. 6, the physical product is a particular graphic t-shirt and the exclusive metaverse digital asset is a virtual digital asset replica of the graphic t-shirt and an additional digital asset accessory that can be used by an avatar in the metaverse platform(s) 170. It will be appreciated that a similar email communication can be used when a guest participates in the retailer event or performs the retailer desired action.

Returning to 260 in FIG. 2, in some embodiments, when the guest has previously linked the guest account with the metaverse account, the retailer online service 110 can automatically transfer the digital asset key to the metaverse account. Accordingly, the guest can retrieve and redeem the digital asset key in the desired metaverse platform without having to enter a digital asset key provided in an electronic communication from the retailer online service 110.

In some embodiments, when the physical product or the retail service is purchased at the retail store, the retailer can provide the digital asset key at the retail store upon purchase of the physical product or the retail service. For example, the retail store can provide the digital asset key at the register. In some embodiments, the retail store can print the digital asset key at the register, for example, on a receipt or separate paper. In some embodiments, the retail store can deliver the digital asset key to the guest via an email address or mobile number provided by the guest at the retail store or to a guest account for the retailer online service 110 provided by the guest at the retail store. The method 200 then proceeds to 270.

At 270, the retailer determines that the retailer desired purchase, participation or action has been returned or cancelled. In some embodiments, the order tracking API 130 is configured to determine that the physical product/retail service associated the exclusive metaverse digital asset has been returned to the retailer or cancelled. Upon determining that the physical product has been returned or the retail service has been cancelled, the method 200 proceeds to 280.

At 280, the retailer determines whether the digital asset key associated with the returned product has been used to redeem the associated exclusive metaverse digital asset within one of the one or more metaverse platforms 170 to obtain the exclusive metaverse digital asset. In some embodiments, the metaverse integration API 145 is configured to communicate with the metaverse platforms 170 to determine whether the digital asset key has been used to redeem the exclusive metaverse digital asset. When the retailer determines that the digital asset key has not been used to redeem the exclusive metaverse digital asset, the method 200 proceeds to 290. When the retailer determines that the digital asset key has been used to redeem the exclusive metaverse digital asset, the method 200, the digital asset key can no longer be revoked or cancelled and the method 200 ends.

At 290, the retailer revokes/cancels the digital asset key. In some embodiments, the metaverse integration API 145 is configured to alert the appropriate metaverse platform(s) 170 that the physical product has been returned to the retailer (or the retail service has been cancelled) and to request that the digital asset key be revoked/canceled such that the digital asset key can no longer be used in the metaverse platform(s) 170 to redeem the exclusive metaverse digital asset.

FIGS. 3A-E, described below, illustrate different screenshots of messages that may be displayed on the retailer GUI 120 or as advertisements on various websites or social media platforms. In particular, FIGS. 3A-E illustrate different non-limiting examples of potential messages 300, 310, 320, 330, 340 and 350 that can be used to notify guests about exclusive metaverse digital assets that can be redeemed by purchasing a physical product or retail service from a retailer. It will be appreciated that similar email communications can be used when a guest participates in a retailer desired event or performs a retailer desired action.

Figure 3A:
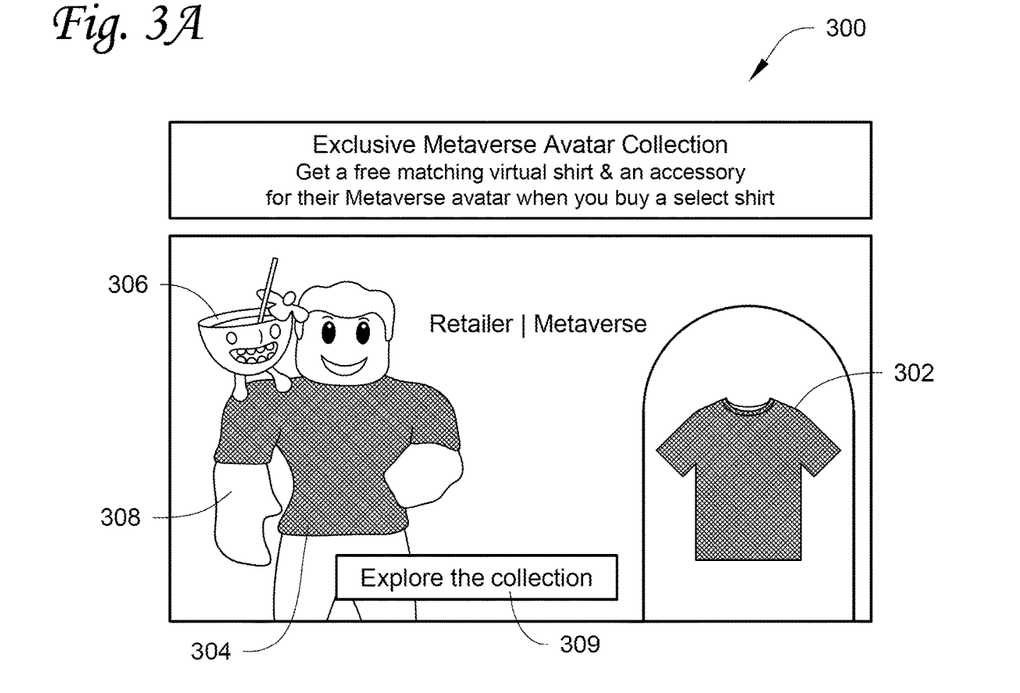
FIG. 3A illustrates a screenshot of a message that may be displayed on a retailer GUI or as advertisements on various websites or social media platforms, according to one embodiment.

FIG. 3A illustrates a screenshot of a message 300 that displays a physical product 302, exclusive multiverse digital assets 304, 306 associated with the purchase of the physical product 302, and multiverse platform avatar 308. In this non-limiting example, the physical product 302 is a graphic t-shirt and the exclusive multiverse digital asset 304 is a virtual digital asset replica of the graphic t-shirt shown on an example multiverse avatar 308. The exclusive multiverse digital asset 306 is a tropical cup creature that is an additional digital asset accessory provided with the virtual digital asset replica (exclusive metaverse digital asset 304) with the purchase of the graphic t-shirt (physical product 302). The message 300 also includes a link 309 that can be selected by a guest to transfer the guest to a portion of the retail GUI 120 showing a collection of physical products that can be purchased from the retailer that will allow the guest to also obtain one or more exclusive multiverse digital assets for use with one or more multiverse platforms 170.

Figure 3B:
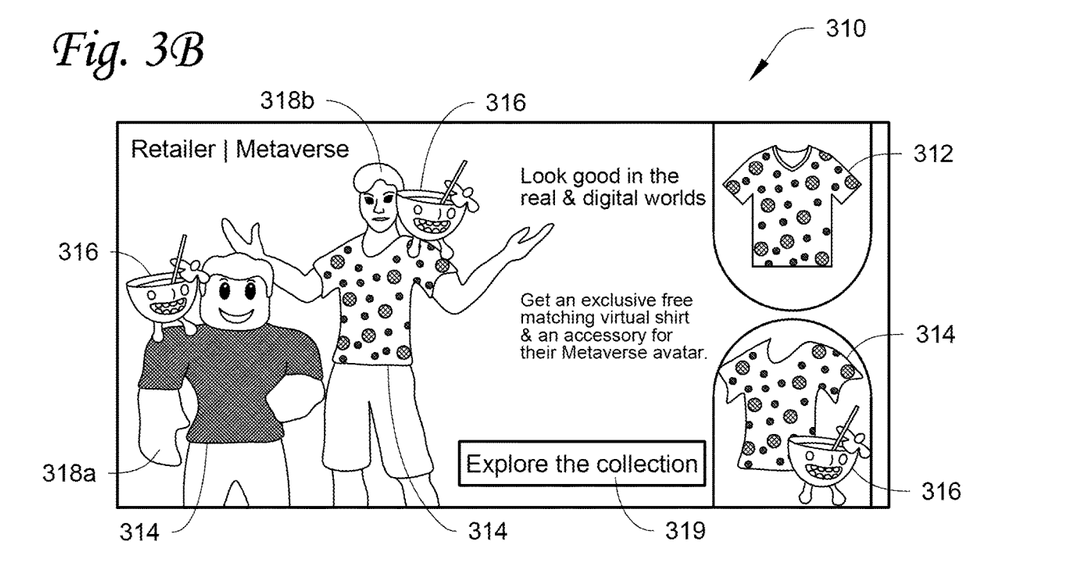
FIG. 3B illustrates a screenshot of a message that may be displayed on a retailer GUI or as advertisements on various websites or social media platforms, according to another embodiment.

FIG. 3B illustrates a screenshot of a message 310 that displays a physical product 312, exclusive multiverse digital assets 314, 316 associated with the purchase of the physical product 312, and multiverse platform avatars 318a,b. In this non-limiting example, the physical product 312 is a graphic t-shirt and the exclusive multiverse digital asset 314 is a virtual digital asset replica of the graphic t-shirt shown on example multiverse avatars 318a,b. The exclusive multiverse digital asset 316 is a tropical cup creature that is an additional digital asset accessory provided with the virtual digital asset replica (exclusive metaverse digital asset 314) with the purchase of the graphic t-shirt (physical product 312). The message 310 also includes a link 319 that can be selected by a guest to transfer the guest to a portion of the retail GUI 120 showing a collection of physical products that can be purchased from the retailer that will allow the guest to also obtain one or more exclusive multiverse digital assets for use with one or more multiverse platforms 170.

Figure 3C:
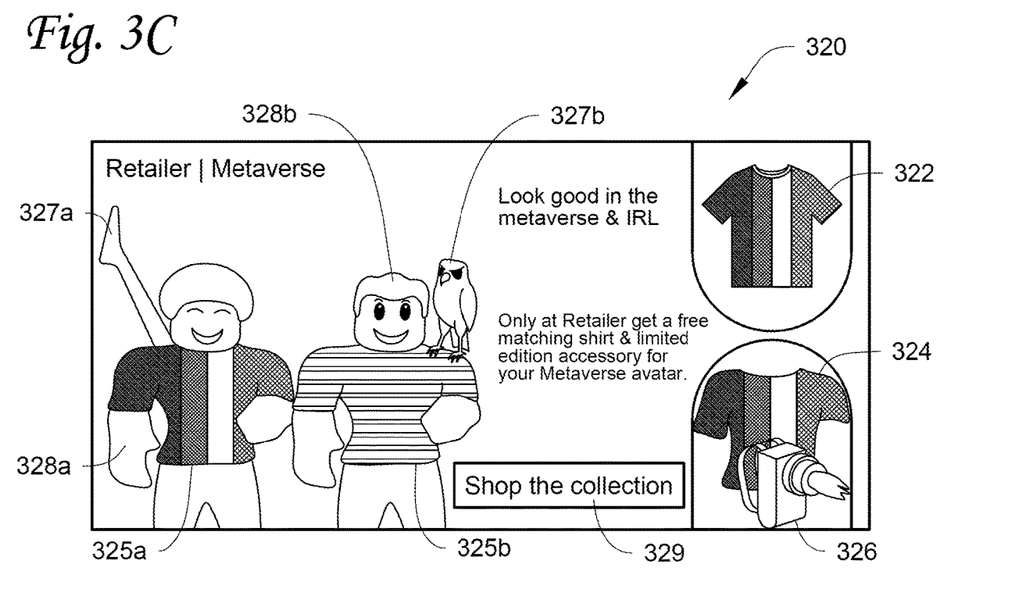
FIG. 3C illustrates a screenshot of a message that may be displayed on a retailer GUI or as advertisements on various websites or social media platforms, according to yet another embodiment.

FIG. 3C illustrates a screenshot of a message 320 that displays a physical product 322, exclusive multiverse digital assets 324, 326 associated with the purchase of the physical product 322. In this non-limiting example, the physical product 322 is a graphic t-shirt and the exclusive multiverse digital asset 324 is a virtual digital asset replica of the graphic t-shirt. The exclusive multiverse digital asset 326 is a jetpack that is an additional digital asset accessory provided with the virtual digital asset replica (exclusive metaverse digital asset 324) with the purchase of the graphic t-shirt (physical product 322). The message 300 also includes multiverse platform avatars 328a,b with exclusive metaverse digital assets 325a,b and 327a,b. In this non-limiting example, the exclusive metaverse digital assets 325a,b are virtual digital graphic t-shirts that are replicas of physical products sold by the retailer. Also, the exclusive metaverse digital asset 327a is a guitar and the exclusive metaverse digital asset 327b is a bird, both of which are additional digital asset accessories provided with the exclusive metaverse digital assets 325a,b. The message 320 also includes a link 329 that can be selected by a guest to transfer the guest to a portion of the retail GUI 120 showing a collection of physical products that can be purchased from the retailer that will allow the guest to also obtain one or more exclusive multiverse digital assets for use with one or more multiverse platforms 170.

Figure 3D:
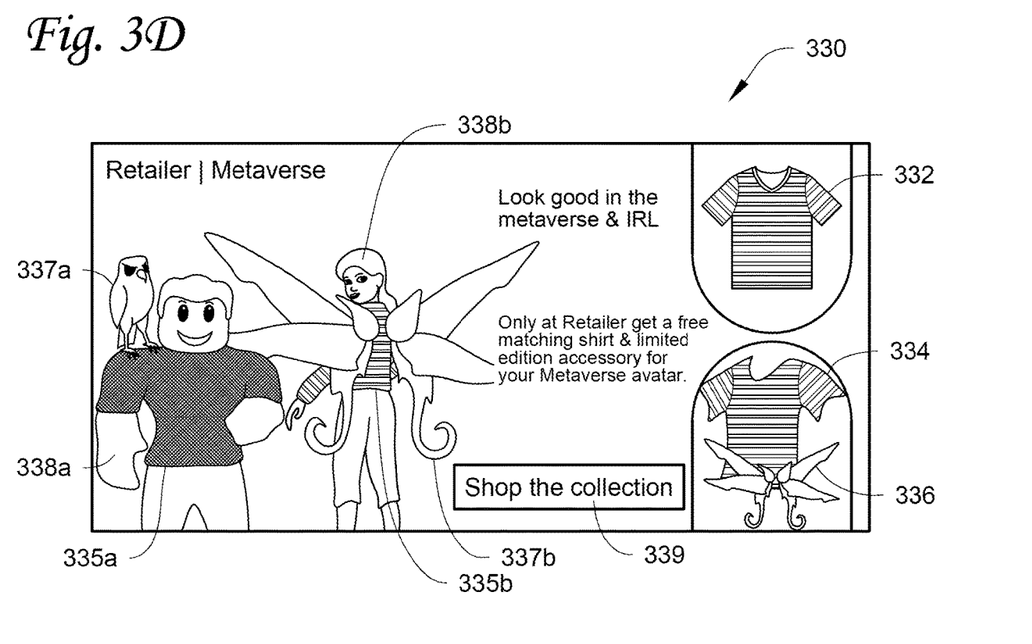
FIG. 3D illustrates a screenshot of a message that may be displayed on a retailer GUI or as advertisements on various websites or social media platforms, according to yet another embodiment.

FIG. 3D illustrates a screenshot of a message 330 that displays a physical product 332, exclusive multiverse digital assets 334, 336 associated with the purchase of the physical product 332, and multiverse platform avatars 338a,b. In this non-limiting example, the physical product 332 is a graphic t-shirt and the exclusive multiverse digital asset 334 is a virtual digital asset replica of the graphic t-shirt. The exclusive multiverse digital asset 336 is a set of wings that is an additional digital asset accessory provided with the virtual digital asset replica (exclusive metaverse digital asset 334) with the purchase of the graphic t-shirt (physical product 332). The multiverse platform avatars 338a,b include exclusive metaverse digital assets 335a,b and 337a,b. In this non-limiting example, the exclusive metaverse digital assets 335a,b are virtual digital graphic t-shirts that are replicas of physical products sold by the retailer. The message 330 also includes a link 339 that can be selected by a guest to transfer the guest to a portion of the retail GUI 120 showing a collection of physical products that can be purchased from the retailer that will allow the guest to also obtain one or more exclusive multiverse digital assets for use with one or more multiverse platforms 170.

Figure 3E:
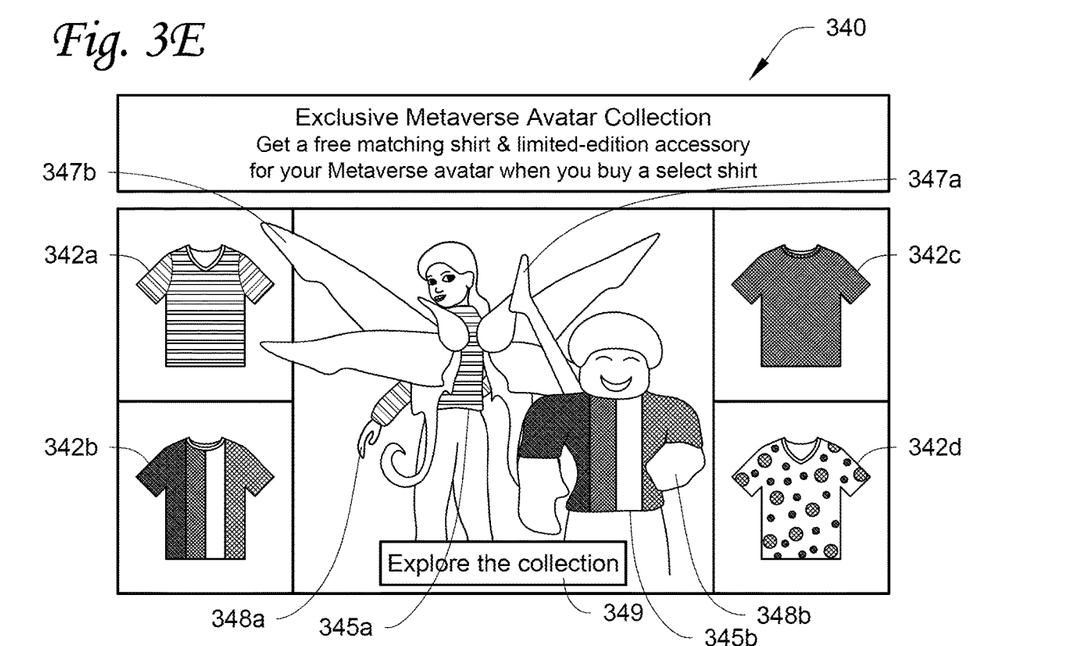
FIG. 3E illustrates a screenshot of a message that may be displayed on a retailer GUI or as advertisements on various websites or social media platforms, according to yet another embodiment.

FIG. 3E illustrates a screenshot of a message 340 that displays physical products 342a-d and multiverse platform avatars 348a,b. In this non-limiting example, the physical products 342a-d are graphic t-shirts. The multiverse platform avatars 348a,b include exclusive metaverse digital assets 345a,b and 347a,b. In this non-limiting example, the exclusive metaverse digital assets 345a,b are virtual digital graphic t-shirts that are replicas of physical products sold by the retailer. In particular, exclusive metaverse digital asset 345a is a virtual digital replica of physical product 342a. Also, the exclusive metaverse digital asset 347a is a guitar and the exclusive metaverse digital asset 347b is a set of wings, both of which are additional digital asset accessories provided with the exclusive metaverse digital assets 345a,b. The message 340 also includes a link 349 that can be selected by a guest to transfer the guest to a portion of the retail GUI 120 showing a collection of physical products that can be purchased from the retailer that will allow the guest to also obtain one or more exclusive multiverse digital assets for use with one or more multiverse platforms 170.

Figure 4:
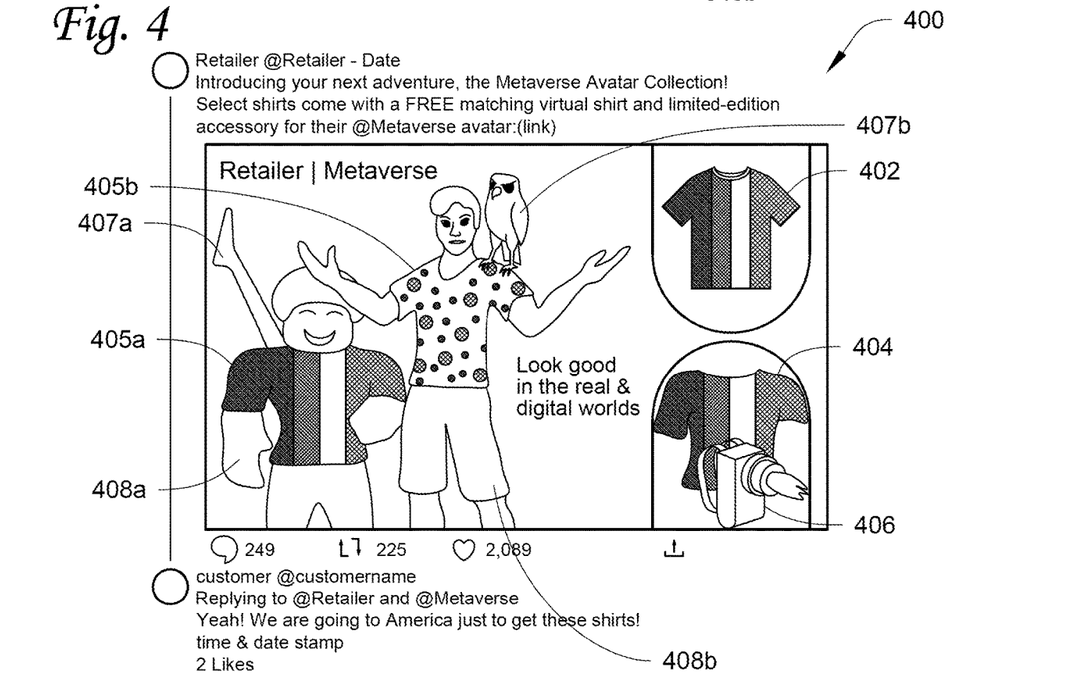
FIG. 4 illustrates a screenshot of a social media message that may be displayed on various websites or social media platforms, according to one embodiment.

FIG. 4 illustrates a screenshot of a social media message 400 that may be displayed on various websites or social media platforms (e.g., Facebook®, Instagram®, Twitter®, TikTok®, Pinterest®, YouTube®, Pinterest®, WhatsApp®, etc.). In particular, FIG. 4 illustrates a non-limiting example of a social media message 400 that can be used to notify guests about exclusive metaverse digital assets that can be redeemed by purchasing a physical product from a retailer. It will be appreciated that a similar social media message can be used when a guest purchases a retail service, participates in a desired retailer event, or performs a retailer desired action.

Social media message 400 displays a physical product 402, exclusive multiverse digital assets 404, 406 associated with the purchase of the physical product 4022, and multiverse platform avatars 408a,b. In this non-limiting example, the physical product 402 is a graphic t-shirt and the exclusive multiverse digital asset 404 is a virtual digital asset replica of the graphic t-shirt. The exclusive multiverse digital asset 406 is a jetpack that is an additional digital asset accessory provided with the virtual digital asset replica (exclusive metaverse digital asset 404) with the purchase of the graphic t-shirt (physical product 402).

Figure 7:
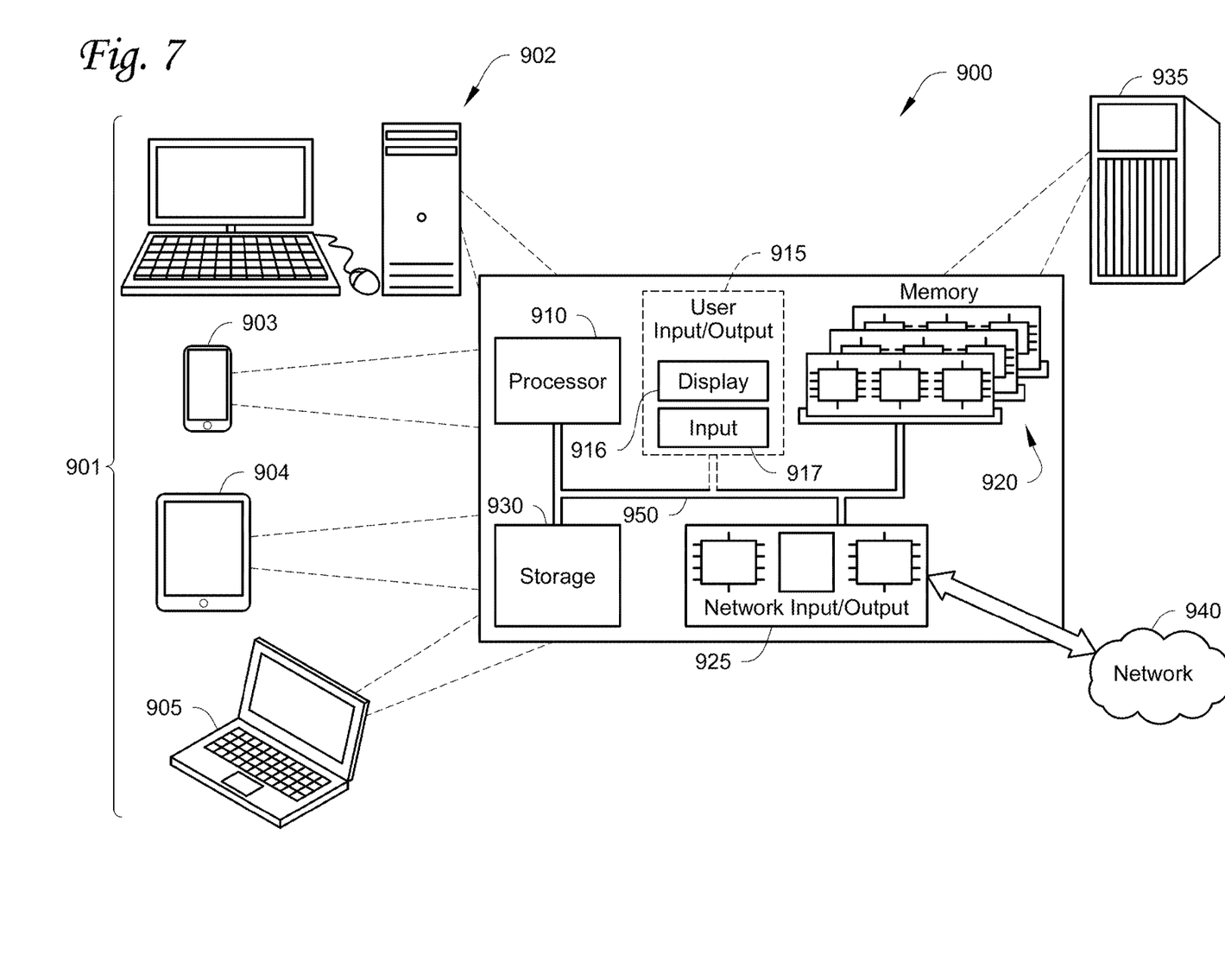
FIG. 7 illustrates a schematic diagram of architecture for a computer device, according to one embodiment.

FIG. 7 is a schematic diagram of architecture for a computer device 900, according to an embodiment. The computer device 900 and any of the individual components thereof can be used for any of the operations described in accordance with any of the computer-implemented methods described herein.

The computer device 900 generally includes a processor 910, memory 920, a network input/output (I/O) 925, storage 930, and an interconnect 950. The computer device 900 can optionally include a user I/O 915, according to some embodiments. The computer device 900 can be in communication with one or more additional computer devices 900 through a network 940.

The computer device 900 is generally representative of hardware aspects of a variety of user devices 901 and a server device 935. The illustrated user devices 901 are examples and are not intended to be limiting. Examples of the user devices 901 include, but are not limited to, a desktop computer 902, a cellular/mobile phone 903, a tablet device 904, and a laptop computer 905. It is to be appreciated that the user devices 901 can include other devices such as, but not limited to, a wearable device, a personal digital assistant (PDA), a video game console, a television, or the like. In an embodiment, the user devices 901 can alternatively be referred to as client devices 901. In such an embodiment, the client devices 901 can be in communication with the server device 935 through the network 940. One or more of the client devices 901 can be in communication with another of the client devices 901 through the network 940 in an embodiment.

The processor 910 can retrieve and execute programming instructions stored in the memory 920 and/or the storage 930. The processor 910 can also store and retrieve application data residing in the memory 920. The interconnect 950 is used to transmit programming instructions and/or application data between the processor 910, the user I/O 915, the memory 920, the storage 930, and the network I/O 940. The interconnect 950 can be, for example, one or more busses or the like. The processor 910 can be a single processor, multiple processors, or a single processor having multiple processing cores. In some embodiments, the processor 910 can be a single-threaded processor. In an embodiment, the processor 910 can be a multi-threaded processor.

The user I/O 915 can include a display 916 and/or an input 917, according to an embodiment. It is to be appreciated that the user I/O 915 can be one or more devices connected in communication with the computer device 900 that are physically separate from the computer device 900. For example, the display 916 and input 917 for the desktop computer 902 can be connected in communication but be physically separate from the computer device 900. In some embodiments, the display 916 and input 917 can be physically included with the computer device 900 for the desktop computer 902. In an embodiment, the user I/O 915 can physically be part of the user device 901. For example, the cellular/mobile phone 903, the tablet device 904, and the laptop 905 include the display 916 and input 917 that are part of the computer device 900. The server device 935 generally may not include the user I/O 915. In an embodiment, the server device 935 can be connected to the display 916 and input 917.

The display 916 can include any of a variety of display devices suitable for displaying information to the user. Examples of devices suitable for the display 916 include, but are not limited to, a cathode ray tube (CRT) monitor, a liquid crystal display (LCD) monitor, a light emitting diode (LED) monitor, or the like.

The input 917 can include any of a variety of input devices or input means suitable for receiving an input from the user. Examples of devices suitable for the input 917 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 917 can be included for the user devices 901. In some embodiments the input 917 can be integrated with the display 916 such that both input and output are performed by the display 916.

The memory 920 is generally included to be representative of a random access memory such as, but not limited to, Static Random Access Memory (SRAM), Dynamic Random Access Memory (DRAM), or Flash. In some embodiments, the memory 920 can be a volatile memory. In some embodiments, the memory 920 can be a non-volatile memory. In some embodiments, at least a portion of the memory can be virtual memory.

The storage 930 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 930 is a computer readable medium. In some embodiments, the storage 930 can include storage that is external to the computer device 900, such as in a cloud.

The network I/O 925 is configured to transmit data via a network 940. The network 940 may alternatively be referred to as the communications network 940. Examples of the network 940 include, but are not limited to, a local area network (LAN), a wide area network (WAN), the Internet, or the like. In some embodiments, the network I/O 925 can transmit data via the network 940 through a wireless connection using Wi-Fi, Bluetooth, or other similar wireless communication protocols. In some embodiments, the computer device 900 can transmit data via the network 940 through a cellular, 3G, 4G, or other wireless protocol. In some embodiments, the network I/O 925 can transmit data via a wire line, an optical fiber cable, or the like. It is to be appreciated that the network I/O 925 can communicate through the network 940 through suitable combinations of the preceding wired and wireless communication methods.

The server device 935 is generally representative of a computer device 900 that can, for example, respond to requests received via the network 940 to provide, for example, data for rendering an online service (e.g., a website, an app, etc.) on the user devices 901. The server 935 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

An embodiment can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for providing a metaverse digital asset for use with a metaverse platform based on a guest at least partially completing a retailer desired purchase, participation or action, the method comprising:

the guest at least partially completing the retailer desired purchase, participation or action via a user device connected to a retailer graphical user interface (GUI) over a communications network, wherein the retailer GUI is hosted by a retailer online service, and wherein the retailer online service is a server device having a non-transitory computer-readable medium having executable instructions stored thereon that, upon execution, cause one or more processors to provide an online shopping experience via the retailer GUI;

the retailer online service identifying that the guest has at least partially completed the retailer desired purchase, participation or action;

the retailer GUI providing a list of a plurality of metaverse platforms to the guest on which the metaverse digital asset can be used;

the guest selecting on the retailer GUI a desired metaverse platform from the plurality of metaverse platforms;

the retailer GUI of the retailer online service requesting permission from the guest to link a guest account that is associated with the guest for the retailer online service with a metaverse account associated with the metaverse platform;

upon receiving permission from the guest to link the guest account with the metaverse account, a metaverse integration API of the retailer online service providing the guest an interface viewable on the retailer GUI to enter login information for logging into the metaverse account;

the metaverse integration API linking the guest account with the metaverse account using the login information received via the retailer GUI;

the retailer online service retrieving an electronic communication address associated with the guest account;

the retailer online service sending an electronic notification, via the communications network to the electronic communication address, notifying the guest that a digital asset key for redeeming the metaverse digital asset is forthcoming;

an order tracking application programming interface (API) of the retailer online service confirming that the retailer desired purchase, participation or action has been at least partially completed;

a digital asset key API of the retailer online service obtaining the digital asset key associated with the retailer desired purchase, participation or action, wherein the digital asset key API obtaining the digital asset key includes the digital asset key API communicating with a database or the desired metaverse platform over the communications network, and the digital asset key API retrieving the digital asset key from the database or the desired metaverse platform over the communications network;

upon confirmation by the order tracking API that the retailer desired purchase, participation or action has been at least partially completed, the retailer online service providing the digital asset key to the guest, wherein the retailer online service providing the digital asset key includes one of:
electronically sending the digital asset key, via the communications network, to the electronic communication address when the guest account is not linked to the metaverse account, and
automatically transferring the digital asset key to the metaverse account when the guest account is linked to the metaverse account to avoid the guest from manually redeeming, in the desired metaverse platform, the digital asset key retrieved via an electronic communication:

the retailer online service determining that the retailer desired purchase, participation or action has been cancelled by the guest; and upon determining that the retailer desired purchase, participation or action has been cancelled by the guest:
the metaverse integration API of the retailer online service determining that the digital asset key has not been used by the guest to redeem the metaverse digital asset, and
the metaverse integration API revoking the digital asset key, wherein the metaverse integration API revoking the digital asset key includes the metaverse integration API communicating, via the communications network, with the metaverse platform and requesting the metaverse platform to revoke the digital asset key, wherein the digital asset key is configured to be used in the metaverse platform to redeem the metaverse digital asset.

2. The method of claim 1, wherein the metaverse digital asset is an exclusive metaverse digital asset only available upon at least partial completion of the retailer desired purchase, participation or action.

3. A system configured to provide a metaverse digital asset based on a guest at least partially completing a retailer desired purchase, participation or action, the system comprising:
- a retailer online service that is a server device having a non-transitory computer-readable medium having executable instructions stored thereon that, upon execution, cause one or more processors to provide an online shopping experience via a retailer graphical user interface (GUI), wherein the retailer online service includes:
  the retailer GUI, hosted by the retailer online service, configured to:
    assist a guest using a user device connected to the retailer GUI over a communications network to at least partially complete the retailer desired purchase, participation or action,
    provide a list of a plurality of metaverse platforms to the guest on which the metaverse digital asset can be used,
    allow a guest to select a desired metaverse platform from the plurality of metaverse platforms,
    request permission from the guest to link a guest account that is associated with the guest for the retailer online service with a metaverse account associated with the metaverse platform,
    receive permission from the guest to link the guest account with the metaverse account; and
  a metaverse integration API configured to:
    provide the guest an interface viewable on the retailer GUI to enter login information for logging into the metaverse account upon the retailer GUI receipt of permission from the guest to link the guest account with the metaverse account,
    link the guest account with the metaverse account using the login information received via the retailer GUI, and
    automatically provide a digital asset key associated with the retailer desired purchase, participation or action to the metaverse account;
  an order tracking application programming interface (API) configured to confirm that the retailer desired purchase, participation or action has been at least partially completed; and
  a digital asset key API configured to obtain the digital asset key associated with the retailer desired purchase, participation or action by:
    communicating with a database or the desired metaverse platform over the communications network, and
    retrieving the digital asset key from the database or the desired metaverse platform over the communications network;
  wherein the retailer online service is configured to:
    receive an electronic communication address associated with the guest account,
    send an electronic notification, via the communications network, to the electronic communication address notifying the guest that a digital asset key for redeeming the metaverse digital asset is forthcoming,
  wherein the retailer online service is configured to identify that the guest has at least partially completed the retailer desired purchase, participation or action,
  wherein, upon confirmation by the order tracking API that the retailer desired purchase, participation or action has been at least partially completed, the retailer online service is configured to provide the digital asset key to the guest by one of:
    electronically sending the digital asset key, via the communications network, to the electronic communication address when the guest account is not linked to the metaverse account, and
    automatically transferring the digital asset key to the metaverse account when the guest account is linked to the metaverse account to avoid the guest from manually redeeming, in the desired metaverse platform, the digital asset key retrieved via an electronic communication,
  wherein the retailer online service is configured to determine whether the retailer desired purchase, participation or action has been cancelled by the guest, and upon determining that the retailer desired purchase, participation or action has been cancelled by the guest:
    the metaverse integration API of the retailer online service is configured to determine whether the digital asset key has not been used by the guest to redeem the metaverse digital asset, and
    upon determining that the digital asset key has not been used by the guest, the metaverse integration API is configured to revoke the digital asset key by communicating over the communications network with the desired metaverse platform and requesting the metaverse platform to revoke the digital asset key, and
  wherein the digital asset key is configured to be used in the metaverse platform to redeem the metaverse digital asset.

4. The system of claim 3, wherein the metaverse digital asset is an exclusive metaverse digital asset only available upon at least partial completion of the retailer desired purchase, participation or action.

5. The method of claim 1, wherein the electronic communication address is at least one of an email address and a mobile phone number associated with the guest account.

6. The method of claim 1, wherein metaverse digital asset is an exclusive metaverse digital asset that is virtual replica of the retailer desired purchase.

7. The method of claim 1, further comprising the retailer online service sending, via the communications network, a promotional electronic communication displaying a physical product and the metaverse digital asset associated with a purchase of the physical product,
  wherein the promotional electronic message includes a link that when selected on the user device causes the retailer GUI to be displayed on the user device, and
  wherein the retailer GUI displays the physical product for purchase from the retailer online service along with the metaverse digital asset redeemable upon purchase of the physical product.

8. The method of claim 1, wherein the electronic communication includes information indicating that a physical product or a retail service purchased is being processed and indicates where the physical product will be shipped or available for pickup, or how the retail service will be processed.

9. The system of claim 3, wherein the electronic communication address is at least one of an email address and a mobile phone number associated with the guest account.

10. The system of claim 3, wherein metaverse digital asset is an exclusive metaverse digital asset that is virtual replica of the retailer desired purchase.

11. The system of claim 3, wherein the retailer online service is configured to send, via the communications network, a promotional electronic communication displaying a physical product and the metaverse digital asset associated with a purchase of the physical product,
   wherein the promotional electronic message includes a link that when selected on the user device causes the retailer GUI to be displayed on the user device, and
   wherein the retailer GUI is configured to display the physical product for purchase from the retailer online service along with the metaverse digital asset redeemable upon purchase of the physical product.

12. The system of claim 3, wherein the electronic communication includes information indicating that a physical product or a retail service purchased is being processed and indicates where the physical product will be shipped or available for pickup, or how the retail service will be processed.

* * * * *